United States Patent [19]

Stutz et al.

[11] Patent Number: 4,507,431

[45] Date of Patent: Mar. 26, 1985

[54] PREPARATION OF CROSSLINKED POLYURETHANE IONOMER DISPERSIONS

[75] Inventors: Herbert Stutz, Karlsruhe; Günter Eckert, Limburgerhof, both of Fed. Rep. of Germany

[73] Assignee: BASF Aktiengesellschaft, Ludwigshafen, Fed. Rep. of Germany

[21] Appl. No.: 530,384

[22] Filed: Sep. 8, 1983

[30] Foreign Application Priority Data

Sep. 10, 1982 [DE] Fed. Rep. of Germany ....... 3233605

[51] Int. Cl.³ ....................... C08L 75/04; C08G 18/10

[52] U.S. Cl. .................................... 524/840; 524/591

[58] Field of Search ................................ 524/840, 591

[56] References Cited

U.S. PATENT DOCUMENTS 3,539,483 11/1970 Keberle .............................. 524/840

4,066,591 1/1978 Seriven .............................. 524/840

4,108,814 8/1978 Reiff .................................. 524/840

4,387,181 6/1983 Brown ................................ 524/840

FOREIGN PATENT DOCUMENTS 703360 2/1965 Canada ............................... 524/839

837174 3/1970 Canada ............................... 524/840

1584865 10/1977 United Kingdom .

2031920 4/1980 United Kingdom ................ 524/840

*Primary Examiner*—C. Warren Ivy

*Attorney, Agent, or Firm*—Oblon, Fisher, Spivak, McClelland & Maier

[57] ABSTRACT

Aqueous dispersions of crosslinked polyurethane ionomers can be advantageously obtained by a method in which polyurethane prepolymers possessing salt groups and aliphatically and/or cycloaliphatically bonded terminal isocyanate groups, in a water-miscible organic solvent, are mixed with polyfunctional polyisocyanates, the resulting solution is dispersed in water and the organic solvent is evaporated off.

1 Claim, No Drawings

PREPARATION OF CROSSLINKED POLYURETHANE IONOMER DISPERSIONS

The present invention relates to a process for the preparation of crosslinked polyurethane ionomer dispersions, from which coatings having improved properties, in particular less sensitivity to temperature and a higher softening point, can be prepared.

The preparation of emulsifier-free aqueous polyurethane dispersions by incorporating ionic centers into the polymer molecule, dissolving the substance in a water-containing organic solvent and removing the organic solvent has been disclosed, and is described in, for example, U.S. Pat. No. 3,479,310.

In this process, an isocyanate-containing prepolymer is usually first prepared from preferably linear high molecular weight dihydroxy compounds, diisocyanates and low molecular weight chain-lengthening agents in a water-miscible organic solvent which boils at below 100° C., and the prepolymer obtained is reacted with an ionic chain-lengthening agent which possesses two coreactive groups, in general hydroxy or amino groups, and a salt group or a group which can be converted to a salt. Water is then stirred into the solution of this ionically modified polyurethane, and the organic solvent is evaporated off. In this manner, both cationic and anionic dispersions can be prepared.

Owing to their good properties, products obtained in this manner are used on an industrial scale in some fields. However, they still have certain deficiencies, which restrict their use. For example, coatings prepared from these products frequently exhibit unsatisfactory behavior at elevated temperatures, softening rapidly and beginning to stick.

Furthermore, U.S. Pat. Nos. 3,870,684 and 3,770,681 disclose that aqueous suspensions of fibrous crosslinked polyurethane particles can be prepared by reacting prepolymers carrying polyfunctional. NCO groups with polyamines in an aqueous medium, while stirring vigorously. However, these suspensions do not form films, and the particles present in them can be welded together only at high temperatures. The suspensions are therefore suitable only for special applications, for example for hot-seal bonds. Finally, U.S. Pat. No. 3,948,837 describes a process for the preparation of dispersions of crosslinked polyurethanes, in which branched polyesters are reacted with isophorone diisocyanate, low molecular weight chain-lengthening agents and alkali metal salts of monoamino acids. However, this process is also unsatisfactory since it is difficult to reproduce and gives products which are variable with respect to their properties.

We have found that aqueous dispersions of crosslinked polyurethane ionomers can be advantageously prepared by reacting an isocyanate-containing prepolymer with a polyfunctional compound by a method wherein a polyurethane prepolymer which possesses salt groups and aliphatically and/or cycloaliphatically bonded isocyanate groups, in a water-miscible organic solvent having a boiling point of from 20° to 100° C., is mixed with a polyfunctional polyisocyanate, the resulting solution is dispersed in water, and the organic solvent is evaporated off. When the solution of the polyurethane prepolymer possessing terminal isocyanate groups and of the low molecular weight polyisocyanate is mixed with water, the latter reacts with the isocyanate groups of the prepolymer and of the low molecular weight polyisocyanate, crosslinking taking place. This is surprising, since it was to be expected that the reaction with water would lead to rapid chain termination and to the formation of predominantly low molecular weight products.

Polyurethane prepolymers possessing salt groups and aliphatically and/or cycloaliphatically bonded isocyanate groups are employed in the novel process. These polyurethane prepolymers should preferably contain from 0.1 to 2% by weight of isocyanate groups. They can be prepared in general from polyhydroxy compounds having molecular weights of from 800 to 5,000, preferably from 800 to 3,000, organic diisocyanates and, if appropriate, low molecular weight chain-lengthening agents having molecular weights of below 500. The prepolymers should preferably contain from 0.02 to 1% by weight of salt-like groups.

Any conventional polyester, polyether, polyetherester, polythioether, polylactone, polyacetal, polyesteramide or polyamide having a molecular weight of from 800 to 5,000, particularly advantageously from 800 to 3,000, is a suitable high molecular weight polyhydroxy compound for the preparation of the prepolymer. These polyhydroxy compounds are in general predominantly linear and are hence bifunctional with regard to isocyanate additions. For the reaction with the polyisocyanates, they can be employed in a conventional manner, either alone or mixed with one another or in succession.

Suitable polyesters having terminal hydroxyl groups can be prepared from, for example, dicarboxylic acids of 2 to 12, preferably 4 to 8, carbon atoms and polyhydric alcohols. The dicarboxylic acids can be aliphatic, cycloaliphatic, aromatic and/or heterocyclic in character, and can, if appropriate, contain heteroatoms, be substituted by, for example, halogen atoms and/or be olefinically unsaturated.

Examples of suitable dicarboxylic acids are aliphatic ones, such as succinic acid, glutaric acid, adipic acid, suberic acid, azelaic acid or sebacic acid, cycloaliphatic ones, such as hexahydrophthalic acid or endomethylenetetrahydrophthalic acid, aromatic ones, such as phthalic acid, isophthalic acid, terephthalic acid, naphthalenedicarboxylic acid or tetrachlorophthalic acid, unsaturated ones, such as maleic acid or fumaric acid, and dimeric fatty acids.

The dicarboxylic acids, too, can be used individually, as a mixture or in succession. To prepare the hydroxyl-containing polyesters, it may be advantageous to replace the free carboxylic acids by carboxylic acid derivatives, for example carboxylates where the alcohol radical is of 1 to 4 carbon atoms, carboxylic acid anhydrides or carboxylic acid chlorides. If required, cyclic lactones may also be present.

Examples of polyhydric alcohols are diols of 2 to 16, preferably 2 to 6, carbon atoms, which can, if appropriate, contain heteroatoms, be unsaturated and/or be substituted, eg. ethylene glycol, propylene 1,2-glycol, propylene 1,3-glycol, butane-1,3-diol, butane-1,4-diol, butane-2,3-diol, pentane-1,5-diol, hexane-1,6-diol, octane-1,8-diol, decane-1,10-diol, neopentyl glycol, 2-methylpropane-1,3-diol, 3-methylpentane-1,5-diol, diethylene glycol, dipropylene glycol and dibutylene glycol and their homologs having molecular weig,hts of not more than about 1,000. Furthermore, small amounts of amino alcohols or diamines, eg. ethanolamine, N-methylethanolamine, propanolamine, ethylenediamine, hexamethylenediamine or piperazine, as well as small amounts of polyfunctional, preferably trifunctional, alcohols, in particular glycerol, trimethylolpropane or hexanetriol, can be present.

Polyhydric alcohols of the above type can also be employed alone, in the form of any desired mixture with one another, or in succession. Other suitable compounds are hydroxyl-containing polyesters of carbonic acid with the above diols, in particular those of 4 to 6 carbon atoms, eg. butanediol and/or hexanediol, as well as polymers of cyclic lactones, eg. unsubstituted or substituted ε-caprolactone.

Suitable high molecular weight hydroxyl-containing polyethers are the conventional polymers of epoxides, eg. ethylene oxide, propylene oxide, butylene oxide, epichlorohydrin or styrene oxide, which are prepared in the presence of a Lewis acid, eg. $BF_3$, or adducts of these epoxides, if appropriate used in the form of any desired mixture with one another or in succession, with difunctional and/or trifunctional initiator molecules, such as water, ammonia or amines, eg. aniline, or preferably polyhydric alcohols, eg. ethylene glycol, propylene glycol, butanediol, glycerol, trimethylolpropane, hexanetriol, hydroquinone, cyclohexanediol, 4,4-dihydroxydiphenylpropane or 4,4'-dihydroxydicyclohexylpropane. Polymers of cyclic ethers, eg. tetrahydrofuran, hexamethylene oxide or octamethylene oxide, and hydroxyl-containing polybutadienes are also suitable.

Preferred polyacetals are water-insoluble formals, eg. polybutanediol-formal or polyhexanediol-formal. Particularly suitable polythioethers are the condensates of thiodiglycol with itself and/or with other glycols, dicarboxylic acids, formaldehyde, aminocarboxylic acids or amino alcohols. Depending on the co-component, the product obtained is a mixed polythioether, a polythioetherester or a polythioether-ester-amide.

Suitable diisocyanates for the preparation of the prepolymers are any conventional aliphatic, cycloaliphatic, aromatic or aliphatic-aromatic diisocyanates, e. g. butane 1,4-diisocyanate, hexane 1,6-diisocyanate, 2,2,4 - and 2,4,4-trimethylhexamethylene diisocyanate, dimeryl diisocyanate, lysine ester diisocyanate, cyclohexane diisocyanate, methylcyclohexane diisocyanate, isophorone diisocyanate, xylylene diisocyanate, dicyclohexylmethane diisocyanate, diphenylmethane diisocyanate, diphenylethane diisocyanate, toluene 2,4- and 2,6-diisocyanate and their industrial isomer mixtures, naphthalene 1,5-diisocyanate, diphenyl diisocyanate, 3,3'-dimethyl-4,4'-diisocyanatodiphenyl, phenylcyclohexylmethane diisocyanate and phenylethyl diisocyanate. The above diisocyanates can be employed alone, mixed with one another or in succession. However, an essential feature of the invention is that the prepolymers contain exclusively aliphatic or cycloaliphatic terminal groups. Hence, aromatic diisocyanates must not be used alone but, in accordance with Canadian Patent 1,089,141, only in combination with aliphatic or cycloaliphatic diisocyanates. The aromatic diisocyanates can be employed in an amount of not more than 90, preferably not more than 70, mole %, based on the total amount of all diisocyanates used.

Low molecular weight chain-lengthening agents which do not possess salt groups, have molecular weights of less than 500 and are suitable for the preparation of the prepolymers are the conventional glycols, eg. ethylene glycol, propylene glycol, butane-1,4-diol, pentanediol, hexane-1,6-diol, neopentylglycol, cyclohexanediol, 2,2-bis-(4-hydroxyethoxyphenyl)-propane, alkoxylated products of hydroquinone, diethylene glycol or dipropylene glycol, diamines, eg. hydrazine, ethylenediamine, propylenediamine, butanediamine, hexamethylenediamine, piperazine, isophoronediamine, cyclohexanediamine, diaminodicyclohexylmethane, toluenediamine or diaminodiphenylmethane, and amino alcohols and water.

In principle, salt groups can be introduced into the prepolymer via any of the components used for its synthesis; however, it is advantageous concomitantly to use appropriate proportions of chain-lengthening agents having a salt group, or a group which can be converted to a salt, and having two groups which are reactive toward isocyanate, as disclosed in, for example, U.S. Pat. No. 3,479,310. These are preferably diamines or diols containing carboxylate and sulfonate groups or quaternary nitrogen atoms. Examples of such compounds for the preparation of cationic dispersions are tertiary amino compounds, such as N-methyldiethanolamine and N-methyldiethylenetriamine. These can be neutralized with an acid or quarternized with an alkylating agent, either before or after they have been incorporated into the prepolymer. Suitable compounds for the preparation of anionic dispersions are essentially the alkali metal or ammonium salts of dihydroxy- or diaminocarboxylic acids or dihydroxy- or diaminosulfonic acids. Diaminocarboxylic acids and diaminosulfonic acids, e.g. lysine, or the adducts of aliphatic diprimary diamines, such as ethylenediamine, with unsaturated carboxylic acids, such as acrylic acid, methacrylic acid, crotonic acid or maleic acid, or their salts are particularly suitable. Sulfonate-containing diamines can, for example, be obtained in a similar manner from diamines and acrylamidopropanesulfonic acid, by adduct formation of propane sulfone with a diamine, or from taurine and ethyleneimine. Compounds with two hydrogen atoms bonded to different nitrogen atoms and with only one salt group in the molecule are preferably employed, ie. compounds which render the product dispersible but do not make it too strongly hydrophilic, and which furthermore are suitable for chain-lengthening. They are used in general in an amount such that the ready-prepared polyurethane composition contains from 0.02 to 1% by weight of salt-like groups.

The high molecular weight polyhydroxy compounds, diisocyanates and low molecular weight chain-lengthening agents without salt groups are used in general in proportions such that the total amount of diisocyanates and low molecular weight chain-lengthening agents without salt groups is from 10 to 80, preferably from 10 to 60, % by weight, based on the total amount of the ready-prepared polyurethane. After modification with the ionic component, the prepolymers contain in general from 0.1 to 2, preferably from 0.1 to 1.5, % by weight of isocyanate groups.

The prepolymers are crosslinked by using the polyfunctional polyisocyanates conventionally employed in polyurethane chemistry or higher functional products obtained by modification of the above diisocyanates and containing carbodiimide, allophanate, biuret, urethane or isocyanurate groups. Aromatic as well as aliphatic and cycloaliphatic polyisocyanates can be used, but particularly preferred compounds are polyisocyanates having cycloaliphatically bonded isocyanate groups, eg. isocyanurate-modified isophorone diisocyanate or biuret-modified or isocyanurate-modified hexane diisocyanate.

The polyfunctional polyisocyanates employed as crosslinking agents are used in amounts such that the ready-prepared polyurethane contains from $10^{-5}$ to $15.10^{-5}$, preferably from $10^{-5}$ to $10.10^{-5}$ mole of crosslinking points per g of polymer. The polyisocyanates can have as high a functionality as desired, but a functionality of from about 2.2 to 4, preferably about 3, is preferred. To establish a low functionality, the higher functional polyisocyanates can also be mixed with appropriate diisocyanates.

It is not critical for the stoichiometry in the crosslinking reaction to be observed exactly, but it has proved advantageous to use about equivalent amounts of isocyanate groups of the prepolymer and isocyanate groups of the crosslinking agent, ie. about one isocyanate group of the crosslinking agent per isocyanate group of the prepolymer, in general from 0.1 to 1.5 isocyanate groups of the former per isocyanate group of the latter.

The polyurethane prepolymer is prepared in a conventional manner by reacting the high molecular weight polyhydroxy compound with the diisocyanate and the low molecular weight chain-lengthening agent without a salt group, in the melt, or in the presence or absence of a water-miscible inert organic solvent which boils below 100° C., under atmospheric or superatmospheric pressure, at from 20° to 120° C., preferably from 50° to 80° C.

If aromatic diisocyanates are employed in combination with aliphatic or cycloaliphatic diisocyanates, these can be used either as a mixture with one another or in succession in the stated sequence for the reaction with the high molecular weight polyhydroxy compounds and, where relevant, the low molecular weight chain-lengthening agents without salt groups. Because the reactivities of the two diisocyanates differ, it is often sufficient to use a mixture of these. If they are employed in succession, it is essential first to use the aromatic diisocyanate and then the aliphatic or cycloaliphatic one in order to ensure that the reaction product possesses terminal aliphatic or cycloaliphatic isocyanate groups. When the two diisocyanates are reacted in succession, it is not essential that the aromatic diisocyanates be completely converted before the aliphatic or cycloaliphatic diisocyanate is added; in many cases, the aliphatic or cycloaliphatic diisocyanate can be added when only some of the aromatic diisocyanate has reacted.

To accelerate the reaction, the conventional catalysts, such as tertiary amines or metal compounds, eg. triethylamine, tributylamine, N,N-dimethylcyclohexylamine, N-methylmorpholine, N,N-dimethylpiperazine, diaza-bicyclooctane, iron(III) chloride, iron acetylacetonate, tin dioctoate, dibutyl-tin dilaurate and tetrabutyl orthotitanate, can be used concomitantly. The time required for complete conversion essentially depends on the temperature, the reactivities of the raw materials employed and the catalyst; in general, from 1 to 5 hours are sufficient.

The prepolymers obtained in this manner and possessing terminal aliphatic or cycloaliphatic isocyanate groups are diluted with a water-miscible solvent which boils at from 20° to 100° C. and is inert to isocyanate groups under the stated reaction conditions, eg. acetone, tetrahydrofuran or methyl ethyl ketone, and the diaminocarboxylic acid salt or diaminosulfonic acid salt, dissolved in water or an organic solvent, is added at from 20° to 80° C. The reaction takes place very rapidly, with only an insignificant increase in viscosity. In the case of cationic dispersions and where N-methyldiethanolamine is used, this compound can, if desired, be employed together with the other components. When the formation of the prepolymer is complete, the tertiary amino group can be converted to a salt by neutralization with an acid or by quarternization.

The solution of the prepolymer having salt groups and terminal aliphatic or cycloaliphatic isocyanate groups is then mixed with the crosslinking agent, and water is stirred into the solution. Dispersion takes place spontaneously on the addition of water. The dispersing process may, if appropriate, be carried out under slightly superatmospheric pressure at from 20° to 80° C. The isocyanate groups of the prepolymer and those of the crosslinking agent react with the water added, crosslinking taking place. The amount of water is in general from 40 to 80, preferably from 50 to 70, % by weight, based on the weight of the prepolymer and of the polyisocyanate (crosslinking agent). The organic solvent is then evaporated off in a conventional manner.

The novel process has the advantage that it enables the degree of crosslinking to be set precisely and reproducibly. The resulting aqueous polyurethane dispersions are finely divided and stable, and can be concentrated, for example, by evaporating down. In general, solvent-free latices having a solids content of from 30 to 50% are preferred. They can be stored for more than 6 months, even in tropical temperatures, and possess excellent film-forming properties. The films obtained have a particularly low sensitivity to temperature and have substantially higher softening points than similar linear polyurethanes. The dispersions can be used to make films, foils, coverings, coatings, finishes and impregnations on various substrates by conventional methods. They show excellent adhesion on leather and glass, and are flexible, firm, tough and resistant to mechanical stress.

The novel crosslinked polyurethane ionomer dispersions can be combined with conventional modifiers and additives, for example with light-stabilizers, heat-stabilizers and stabilizers against discoloration, anti-oxidants, anti-hydrolysis agents, bacteriostatic substances, fungicides, flameproofing agents, plasticizers and dyes. They can also be blended with suitable dispersions of natural or synthetic polymers, for example with aqueous polyacrylate dispersions, butadiene-styrene copolymer dispersions or polyvinyl acetate dispersions.

Further details on other suitable modifiers and additives can be found in, for example, the monograph by J. H. Saunders and K. C. Frisch: "High Polymers", vol. XVI, Polyurethanes, Parts 1 and 2, Interscience 1962 and 1964.

EXAMPLE 1

400 g (0.2 mole) of a commercial polyester obtained from adipic acid, hexanediol and neopentylglycol and having an OH number of 56, 90.1 g (1 mole) of butane-1,4-diol and 90 g of acetone are initially taken in a reaction vessel equipped with a stirrer, a thermometer and a vacuum connection, 0.3 ml of dibutyl-tin dilaurate are added, and the mixture is then reacted with 180 g (1.033 moles) of an industrial isomer mixture comprising 80% of toluene 2,4-diisocyanate and 20% of toluene 2,6-diisocyanate (TDI 80) for 1 hour at 65° C., while stirring. Thereafter, 70.44 g (0.317 mole) of isophorone diisocyanate (IPDI) are added, and stirring is continued for a further 4 hours at 75° C. The reaction mixture is diluted with 600 g of acetone, and 43 g (0.098 mole) of a 40% strength aqueous solution of an adduct of ethylenediamine with sodium acrylate are added at 50° C. The mixture is homogenized, after which 36.4 g of IPDI-T 1890 S (trimerized IPDI, NCO content 11.95%, VEBA) are added and 1,200 g of distilled water are stirred in. The acetone is then distilled off to give a thinly fluid, finely divided dispersion having a solids content of 40%.

Coatings applied onto glass sheets dry at room temperature to give clear, highly glossy and very tough films which are insoluble in organic solvents. They have the following mechanical properties:

Tensile strength (DIN 53 504): 40 N/mm$^2$
Elongation at break (DIN 53 504): 370%
Tear strength (DIN 53 515): 55 N/mm To determine the softening point, a strip of the film is placed on a Kofler heating bench, and the temperature at which the film begins to stick is determined. The softening point determined in this manner is 162° C.

Compared with the non-crosslinked coating of Comparative Experiment 1 below, the reaction according to the invention thus gives softening points which are higher by about 80° C., and better resistance to solvents.

COMPARATIVE EXPERIMENT 1

Using the procedure described in Example 1, a polyurethane dispersion is prepared from the following starting materials:

400 g (0.1788 mole) of the polyester of adipic acid, hexanediol and neopentyl glycol, employed in Example 1,
90.1 g (1 mole) of butane-1,4-diol,
183.9 g (1.056 moles) of TDI 80,
44.5 g (0.2 mole) of IPDI and
39.4 g (0.09 mole) of the 1:1 adduct of ethylenediamine with Na acrylate (as a 40% strength solution), described in Example 1.

Films of the comparison dispersion which are applied onto glass sheets and dried at room temperature have the following properties:

Tensile strength (DIN 53 504): 45 N/mm$^2$
Elongation at break (DIN 53 504): 520%
Tear strength (DIN 53 515): 52 N/mm The softening point (beginning of adhesion) determined on the Kofler heating bench is 85° C.

EXAMPLE 2

Using the procedure described in Example 1, a polyurethane dispersion is prepared from the following starting materials:

400 g (0.2 mole) of the polyester of adipic acid, hexanediol and neopentylglycol, mentioned in Example 1,
90.1 g (1 mole) of butane-1,4-diol,
173 g (0.993 mole) of TDI 80,
87.4 g (0.393 mole) of IPDI,
43 g (0.098 mole) of the 1:1 adduct of ethylenediamine with Na acrylate (as a 40% strength solution), described in Example 1, and
61.7 g of IPDI-T 1890 S (commercial product VEISA, isocyanurate-modified IPDI, NCO content 11.95%).

The films prepared from the resulting dispersion have the following properties:

Tensile strength: 40.5 N/mm$^2$
Elongation at break: 340%
Tear strength: 62 N/mm The softening point determined on the Kofler bench is 180° C.

EXAMPLE 3

Using the procedure described in Example 1, a polyurethane ionomer dispersion is prepared from the following starting materials:

411 g (0.2 mole) of a commercial polyester obtained from adipic acid, ethylene glycol and butanediol and having an OH number of 55,
36 g (0.4 mole) of butane-1,4-diol,
85 g (0.488 mole) of TDI 80,
47.3 g (0.213 mole) of IPDI,
31.5 g (0.072 mole) of a 1:1 adduct of ethylenediamine with Na acrylate and
10.1 g of IPDI-T 1890 S.

Films of the dispersion which are applied onto glass sheets have the following properties:

Tensile strength: 28 N/mm$^2$
Elongation at break: 620%
Tear strength: 28 N/mm
Softening point (Kofler bench): 145° C.

EXAMPLE 4

Using the procedure described in Example 1, a dispersion is prepared from the following starting materials:

617 g (0.275 mole) of a commercial polyester obtained from adipic acid, hexanediol and neopentylglycol,
49.5 g (0.55 mole) of butane-1,4-diol,
128.6 g (0.738 mole) of TDI 80,
49.2 g (0.22 mole) of IPDI,
39.4 g (0.09 mole) of the 1:1 adduct of ethylenediamine with Na acrylate (as a 40% strength solution), described in Example 1, and
16.8 g of trimerized hexamethylenediisocyanate (NCO content 22.1%).

Films applied onto glass sheets have the following properties:

Tensile strength: 29 N/mm$^2$
Elongation at break: 610%
Tear strength: 22 N/mm
Softening point (Kofler bench): 153° C.

EXAMPLE 5

Example 3 is repeated, using 200 g (0.2 mole) of a commercial polytetrahydrofuran having a mean molecular weight of 1,000.

The resulting aqueous dispersion gives films having the following properties:

Tensile strength: 38 N/mm$^2$
Elongation at break: 340%
Tear strength: 52 N/mm
Softening point (Kofler bench): 156° C.

We claim:

1. A process for preparing aqueous dispersions of cross-linked polyurethane ionomers, comprising:

(a) mixing an isocyanate-containing prepolymer dissolved in a water-miscible organic solvent having a boiling point of from 20° to 100° C. with a polyfunctional polyisocyanate cross-linking compound having an isocyanate functionality of about 2.2 to 4; said isocyanate-containing prepolymer being prepared from a linear polyhydroxy compound having a molecular weight of from 800 to 5,000, said prepolymer having exclusively aliphatic or cycloaliphatic terminal isocyanate groups in amounts from 0.1 to 2% by weight incorporated therein by employing an aliphatic diisocyanate and/or cycloaliphatic diisocyanate compound alone as the diisocyanate reactant with said polyhydroxy compound or in conjunction with a non-aliphatic or non-cycloaliphatic diisocyanate reactant, and containing salt groups in amounts of from 0.02 to 1% by weight, so that there are from 0.1 to 1.5 isocyanate groups of said polyisocyanate per isocyanate group of said prepolymer;

(b) dispersing the resulting solution in from 40 to 80% by weight based on the polyurethane prepolymer and the polyisocyanate, of water; and (c) evaporating the organic solvent.

* * * * *